(12) United States Patent
Nara et al.

(10) Patent No.: US 12,122,976 B2
(45) Date of Patent: Oct. 22, 2024

(54) REFRIGERATING MACHINE OIL

(71) Applicant: ENEOS CORPORATION, Tokyo (JP)

(72) Inventors: Fumiyuki Nara, Tokyo (JP); Yohei Shono, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 17/920,131

(22) PCT Filed: Apr. 27, 2021

(86) PCT No.: PCT/JP2021/016821
§ 371 (c)(1),
(2) Date: Oct. 20, 2022

(87) PCT Pub. No.: WO2021/221063
PCT Pub. Date: Nov. 4, 2021

(65) Prior Publication Data
US 2023/0159851 A1    May 25, 2023

(30) Foreign Application Priority Data
Apr. 30, 2020  (JP) ................................. 2020-080368

(51) Int. Cl.
| | | |
|---|---|---|
| *C10M 171/00* | (2006.01) | |
| *C09K 5/04* | (2006.01) | |
| *C10M 101/00* | (2006.01) | |
| *C10M 137/04* | (2006.01) | |
| *C10M 145/14* | (2006.01) | |
| *C10M 145/16* | (2006.01) | |
| *C10M 169/04* | (2006.01) | |
| C10N 20/02 | (2006.01) | |
| C10N 30/02 | (2006.01) | |
| C10N 40/30 | (2006.01) | |

(52) U.S. Cl.
CPC ......... *C10M 171/008* (2013.01); *C09K 5/041* (2013.01); *C10M 101/00* (2013.01); *C10M 137/04* (2013.01); *C10M 145/14* (2013.01); *C10M 145/16* (2013.01); *C10M 169/04* (2013.01); *C10M 2203/003* (2013.01); *C10M 2203/10* (2013.01); *C10M 2209/084* (2013.01); *C10M 2209/086* (2013.01); *C10M 2223/041* (2013.01); *C10N 2020/02* (2013.01); *C10N 2030/02* (2013.01); *C10N 2040/30* (2013.01)

(58) Field of Classification Search
None
See application file for complete search history.

(56) References Cited

U.S. PATENT DOCUMENTS

| | | | |
|---|---|---|---|
| 3,915,871 A * | 10/1975 | Bryer | ................... C10M 101/02 |
| | | | 585/13 |
| 5,798,054 A | 8/1998 | Sato et al. | |
| 7,914,697 B2 | 3/2011 | Kaneko | |
| 2005/0039381 A1 | 2/2005 | Langer et al. | |
| 2007/0257229 A1 | 11/2007 | Tagawa et al. | |
| 2010/0093578 A1 | 4/2010 | Tsujimoto et al. | |
| 2012/0322706 A1 | 12/2012 | Matsumoto et al. | |
| 2016/0040089 A1 * | 2/2016 | Baker | ................. C10M 157/04 |
| | | | 508/306 |
| 2019/0241827 A1 | 8/2019 | Kaneko | |

FOREIGN PATENT DOCUMENTS

| | | |
|---|---|---|
| CN | 101400769 A | 4/2009 |
| CN | 109844076 A | 6/2019 |
| EP | 0 586 705 A | 3/1994 |
| EP | 1 995 299 A1 | 11/2008 |
| EP | 2 112 217 A1 | 10/2009 |
| EP | 3 546 551 A1 | 10/2019 |
| JP | 2005-281603 A | 10/2005 |
| JP | 2007-204568 A | 8/2007 |
| JP | 2008-184569 A | 8/2008 |
| JP | 2011-162766 A | 8/2011 |
| JP | 2015-013959 A | 1/2015 |
| JP | 2018-083920 A | 5/2018 |
| WO | 93/013185 A1 | 7/1993 |
| WO | 2005/012469 A1 | 2/2005 |
| WO | 2007/105452 A1 | 9/2007 |
| WO | 2018/097173 A1 | 5/2018 |
| WO | 2020/078770 A1 | 4/2020 |
| WO | 2021/100634 A1 | 5/2021 |

OTHER PUBLICATIONS

ISR issued in International Patent Application No. PCT/JP2021/016821, Jul. 20, 2021, translation.
IPRP issued in International Patent Application No. PCT/JP2021/016821, Nov. 10, 2022, translation.
Search Report issued in EP Patent Application No. 21797478.1, Aug. 11, 2023.

* cited by examiner

*Primary Examiner* — Vishal V Vasisth
(74) *Attorney, Agent, or Firm* — GREENBLUM & BERNSTEIN, P.L.C.

(57) ABSTRACT

An aspect of the present invention provides a refrigerating machine oil containing: a lubricating base oil; a phosphorus-containing additive; and a polymer comprising an unsaturated carboxylic acid ester as a monomer unit.

5 Claims, No Drawings

REFRIGERATING MACHINE OIL

This application is a 371 of PCT/JP2021/016821, filed Apr. 27, 2021.

TECHNICAL FIELD

The present invention relates to a refrigerating machine oil.

BACKGROUND ART

A refrigerating machine such as a refrigerator contains a refrigerant circulation system containing a compressor, a condenser, an expansion mechanism (an expansion valve, a capillary), an evaporator, and the like, and heat exchange is performed by circulating a refrigerant in the refrigerant circulation system.

Compressors for refrigerating machines contains rotary compressors, piston-crank compressors, and the like. For example, in a piston-crank type compressor, a rotary motion of a motor is converted into a reciprocating motion by a connecting rod, and a piston coupled to the connecting rod is reciprocated to compress a refrigerant. The refrigerating machine oil is sealed in a compressor together with a refrigerant, and lubricates sliding members such as a connecting rod and a piston. As such a refrigerating machine oil, for example, the following Patent Document 1 discloses a refrigerating machine oil containing a mineral oil having a relatively low viscosity and a specific copolymer, and the following Patent Document 2 discloses a refrigerating machine oil containing a specific base oil, a phosphorus-based extreme pressure agent, and an ester-based additive.

CITATION LIST

Patent Document
[Patent Document 1] Japanese Unexamined Patent Application Publication No. 2018-83920
[Patent Document 2] International Publication No. 2005/012469

SUMMARY OF INVENTION

Technical Problem

When the viscosity at 100° C. of the conventional refrigerating machine oil is lowered, it is effective to some extent for lowering the friction in the fluid lubrication region, but in a low sliding speed region such as an elastic fluid lubrication region, a mixed lubrication region, or a boundary lubrication region, the opportunity of metal-to-metal contact increases, and the friction tends to increase. In addition, for example, the above-described conventional refrigerating machine oil is expected to be effective to some extent in reducing friction in a boundary lubrication region having a high friction coefficient, but is not necessarily sufficient in improving efficiency of a compressor. In particular, in a lubrication region (an elastic fluid lubrication region or a mixed lubrication region) having a relatively high sliding speed in which the friction coefficient rapidly starts to increase as the sliding speed decreases, which is focused on by the present inventors, there is a problem in that the friction coefficient rather increases.

The present invention has been made in view of the above-described circumstances, and an object thereof is to provide a refrigerating machine oil having excellent friction characteristics even in a low sliding speed region while maintaining low friction characteristics in a lubrication region having a relatively high sliding speed as described above.

Solution to Problem

An aspect of the present invention provides a refrigerating machine oil containing: a lubricating base oil; a phosphorus-containing additive; and a polymer comprising an unsaturated carboxylic acid ester as a monomer unit.

The lubricating base oil may contain a first hydrocarbon base oil having a kinematic viscosity at 40° C. of less than 6 mm$^2$/s. In this case, the lubricating base oil may be a mixed base oil of the first hydrocarbon base oil and a second hydrocarbon base oil having a kinematic viscosity at 40° C. of 6 mm$^2$/s or more, and a (A)/(B) ratio is more than 1 and 1.5 or less, wherein (A) is a kinematic viscosity at 40° C. of the mixed base oil, and (B) is the kinematic viscosity at 40° C. of the first hydrocarbon base oil.

The refrigerating machine oil may have a kinematic viscosity at 40° C. of 10 mm$^2$/s or less.

The unsaturated carboxylic acid ester may be an unsaturated carboxylic acid ester having at least one alkyl group selected from a straight-chain alkyl group having 1 to 18 carbon atoms and a branched alkyl group having 4 to 40 carbon atoms.

The unsaturated carboxylic acid ester may be a (meth)acrylic acid ester. The (meth)acrylic acid ester may contain at least one selected from a (meth)acrylic acid ester having a linear alkyl group having 1 to 18 carbon atoms. The (meth)acrylic acid ester may contain at least one selected from a (meth)acrylic acid ester having a linear alkyl group having 1 to 18 carbon atoms and at least one selected from a (meth)acrylic acid ester having a 2-position branched alkyl group having 4 or more and less than 20 carbon atoms.

The unsaturated carboxylic acid ester may be an unsaturated dicarboxylic acid ester. The unsaturated dicarboxylic acid ester includes at least one selected from unsaturated dicarboxylic acid esters having a linear alkyl group having 4 to 10 carbon atoms.

The polymer may be a copolymer. The copolymer may be a copolymer containing the unsaturated carboxylic acid ester and an α-olefin as monomer units.

Advantageous Effects of Invention

According to the present invention, it is possible to provide a refrigerating machine oil having excellent friction characteristics even in a region where the sliding speed is low while maintaining low friction characteristics particularly in a lubrication region where the sliding speed is relatively high.

DESCRIPTION OF EMBODIMENTS

Hereinafter, embodiments of the present invention will be described in detail.

The refrigerating machine oil according to the present embodiment contains a lubricating base oil, a phosphorus-containing additive, and a polymer containing an unsaturated carboxylic acid ester as a monomer unit.

The lubricating base oil may be any of a mineral oil, a synthetic oil, or a mixture of both. However, from the viewpoint of achieving more excellent frictional properties, it is preferable that the lubricating base oil contains a mineral oil. When the lubricating base oil contains a mineral oil, the lubricating base oil may consist of only the mineral oil (that is, the content of the mineral oil is 100% by mass based on the total amount of the lubricating base oil), and may further contain a base oil component other than the mineral oil. When a base oil component other than the mineral oil is further contained, the content of the mineral oil may be 50% by mass or more, 70% by mass or more, or 90% by mass or more, based on the total amount of the lubricating base oil.

Examples of the mineral oil include mineral oils such as paraffinic mineral oils and naphthenic mineral oils, which are obtained by subjecting a lubricating oil fraction obtained by atmospheric distillation and vacuum distillation of crude oil to refining treatment such as solvent deasphalting, solvent extraction, hydrocracking, solvent dewaxing, catalytic dewaxing, hydrorefining, sulfuric acid washing, and clay treatment alone or in an appropriate combination of two or more thereof. The paraffinic mineral oils are particularly preferably used. These mineral oils may be used alone or in combination of two or more thereof at any ratio.

The ratio of % $C_P$ to % $C_N$ (% $C_P$/% $C_N$) of the mineral oil may be, for example, 0.2 or more, preferably 0.5 or more, more preferably 1 or more, and even more preferably 1.1 or more.

The ratio of % $C_P$ to % $C_N$ (% $C_P$/% $C_N$) of the paraffinic mineral oil may be preferably more than 1, more preferably 1.1 or more, and even more preferably 1.5 or more. When the % $C_P$/% $C_N$ of the paraffinic mineral oil is more than 1, the flash point (COC) is improved (for example, 100° C. or more, preferably 120° C. or more), and a refrigerating machine oil having more excellent friction characteristics can be obtained. In the present specification, % $C_P$ and % $C_N$ mean values measured by a method (n-d-M ring analysis) according to ASTM D3238-95 (2010). The flash point (COC) means a flash point according to the Cleveland open method measured in accordance with JIS K2265-4 (2007).

Examples of the synthetic oil include synthetic hydrocarbon oils and oxygen-containing oils. Examples of the synthetic hydrocarbon oil include alkylbenzenes, alkylnaphthalenes, poly α-olefins (PAO), polybutenes, and ethylene-α-olefin copolymers.

Examples of the oxygen-containing oil include esters, ethers, carbonates, ketones, silicones, and polysiloxanes. The term "ester" used herein does not include the above-mentioned polymer. Examples of the ester include a monoester, a polyol ester, an aromatic ester, a dibasic acid ester, a complex ester, a carbonate ester and a mixture thereof. Among these, it is preferable to use a monoester of a monohydric aliphatic alcohol and a monocarboxylic fatty acid, and it is desirable to use a mixture of the monoester and a polyol ester of a di to hexa-hydric alcohol and a monocarboxylic fatty acid as necessary.

Examples of the monohydric aliphatic alcohol constituting such an ester include monohydric aliphatic alcohols having 1 to 20 carbon atoms, preferably 4 to 18 carbon atoms, and more preferably 4 to 12 carbon atoms. Examples of the monocarboxylic fatty acid constituting such an ester include monocarboxylic fatty acids having 1 to 20 carbon atoms, preferably 4 to 18 carbon atoms, and more preferably 4 to 12 carbon atoms. Preferred examples of the di to hexa-hydric alcohol constituting such an ester include neopentyl glycol, trimethylolpropane, pentaerythritol, and dipentaerythritol. Examples of the ether include polyvinyl ether, polyalkylene glycol, polyphenyl ether, perfluoroether, and mixtures thereof.

The lubricating base oil may contain a hydrocarbon base oil. As the hydrocarbon base oil, for example, a mineral hydrocarbon oil, a synthetic hydrocarbon oil, or a mixture thereof can be used.

When the lubricating base oil contains a hydrocarbon base oil, it preferably contains a hydrocarbon base oil having a kinematic viscosity at 40° C. of less than 6 mm²/s (hereinafter also referred to as "first hydrocarbon base oil"). When the lubricating base oil contains the first hydrocarbon base oil, the friction coefficient can be more effectively reduced.

From this viewpoint, the kinematic viscosity at 40° C. of the first hydrocarbon base oil is more preferably 5 mm²/s or less, and even more preferably 4 mm²/s or less. The lower limit of the kinematic viscosity at 40° C. of the first hydrocarbon base oil is not particularly limited, and is, for example, more than 0 mm²/s, preferably 0.5 mm²/s or more, more preferably 1 mm²/s or more, and even more preferably 1.5 mm²/s or more. The kinematic viscosity in the present specification means kinematic viscosity measured in accordance with JIS K2283:2000.

When the lubricating base oil contains the first hydrocarbon base oil, it is preferable that the lubricating base oil further contains a hydrocarbon base oil having a kinematic viscosity at 40° C. of 6 mm²/s or more (hereinafter, also referred to as "second hydrocarbon base oil") in addition to the first hydrocarbon base oil. That is, the lubricating base oil may be a mixed base oil of a first hydrocarbon base oil and a second hydrocarbon base oil. When the lubricating base oil contains the second hydrocarbon base oil in addition to the first hydrocarbon base oil, the friction coefficient can be more effectively reduced.

From such a viewpoint, the kinematic viscosity at 40° C. of the second hydrocarbon base oil is more preferably 8 mm²/s or more, even more preferably 10 mm²/s or more, particularly preferably 50 mm²/s or more, and extremely preferably 90 mm²/s or more. The upper limit of the kinematic viscosity at 40° C. of the second hydrocarbon base oil is not particularly limited, and is, for example, 1000 mm²/s or less, or preferably 500 mm²/s or less.

In the case where the lubricating base oil is a mixed base oil of the first hydrocarbon base oil and the second hydrocarbon base oil, a (A)/(B) ratio is preferably 1.5 or less wherein the kinematic viscosity at 40° C. of the mixed base oil is (A) and the kinematic viscosity at 40° C. of the first hydrocarbon base oil is (B). When the (A)/(B) ratio is 1.5 or less, the friction coefficient can be more effectively reduced. From such a viewpoint, the (A)/(B) ratio is more preferably 1.4 or less, more preferably 1.35 or less, still more preferably 1.3 or less, and particularly preferably 1.25 or less. The lower limit of (A)/(B) ratio is not particularly limited, but is usually more than 1, and may be, for example, 1.1 or more. When a plurality of base oil components corresponding to the first hydrocarbon base oil or the second hydrocarbon base oil are contained, the above (A) means the kinematic viscosity at 40° C. of the mixed base oil containing all the base oil components corresponding to the first hydrocarbon base oil or the second hydrocarbon base oil. In addition, when a plurality of base oil components corresponding to the first hydrocarbon base oil are contained, (B) means the kinematic viscosity at 40° C. of the mixed base oil containing all of the base oil components corresponding to the first hydrocarbon base oil.

The content of the first hydrocarbon base oil may be 50% by mass or more, 60% by mass or more, 70% by mass or more, 80% by mass or more, 90% by mass or more, or 95% by mass or more, based on the total amount of the first hydrocarbon base oil and the second hydrocarbon base oil (that is, the total amount of the mixed base oil; the same applies hereinafter). The upper limit of the content of the first hydrocarbon base oil is not particularly limited, and may be, for example, less than 100% by mass, 99.9% by mass or less, 99.5% by mass or less, or 99% by mass or less, based on the total amount of the first hydrocarbon base oil and the second hydrocarbon base oil.

The content of the first hydrocarbon base oil may be 50% by mass or more, 60% by mass or more, 70% by mass or more, 80% by mass or more, or 85% by mass or more, based on the total amount of the refrigerating machine oil. The upper limit of the content of the first hydrocarbon base oil is not particularly limited, and may be, for example, 98% by mass or less, 95% by mass or less, or 90% by mass or less, based on the total amount of the refrigerating machine oil.

The content of the second hydrocarbon base oil may be 0.1% by mass or more, 0.5% by mass or more, or 1% by mass or more, based on the total amount of the first hydrocarbon base oil and the second hydrocarbon base oil. The upper limit of the content of the second hydrocarbon base oil may be, for example, 50% by mass or less, 40% by mass or less, 30% by mass or less, 20% by mass or less, 10% by mass or less, or 5% by mass or less, based on the total amount of the first hydrocarbon base oil and the second hydrocarbon base oil.

The content of the second hydrocarbon base oil may be 0.1% by mass or more, 0.5% by mass or more, 1% by mass or more, or 3% by mass or more, based on the total amount of the refrigerating machine oil. The upper limit of the content of the second hydrocarbon base oil is not particularly limited, and may be, for example, 50% by mass or less, 40% by mass or less, 30% by mass or less, 20% by mass or less, 10% by mass or less, or 5% by mass or less, based on the total amount of the refrigerating machine oil.

The total content of the first hydrocarbon base oil and the second hydrocarbon base oil may be, for example, 50% by mass or more, 60% by mass or more, 70% by mass or more, 80% by mass or more, 90% by mass or more, or 100% by mass, based on the total amount of the lubricating base oil.

The total content of the first hydrocarbon base oil and the second hydrocarbon base oil may be 50% by mass or more, 60% by mass or more, 70% by mass or more, 80% by mass or more, or 90% by mass or more, based on the total amount of the refrigerating machine oil.

From the viewpoint of more effectively reducing the friction coefficient in a low sliding speed region, the kinematic viscosity at 40° C. of the lubricating base oil is preferably 20 mm$^2$/s or less, more preferably 10 mm$^2$/s or less, even more preferably 6 mm$^2$/s or less, and particularly preferably 3.5 mm$^2$/s or less. The kinematic viscosity at 40° C. of the lubricating base oil is not particularly limited, and may be, for example, 0.5 mm$^2$/s or more, preferably 1 mm$^2$/s or more, and more preferably 1.5 mm$^2$/s or more.

The kinematic viscosity at 100° C. of the lubricating base oil may be a preferably 0.5 mm$^2$/s or more, more preferably 0.8 mm$^2$/s or more, still more preferably 1 mm$^2$/s or more. The kinematic viscosity at 100° C. of the lubricating base oil may be preferably 10 mm$^2$/s or less, more preferably 5 mm$^2$/s or less, still more preferably 3 mm$^2$/s or less, particularly preferably 2 mm$^2$/s or less or 1.5 mm$^2$/s or less.

The content of the lubricating base oil may be 50% by mass or more, 60% by mass or more, 70% by mass or more, 80% by mass or more, or 90% by mass or more, and may be 99.9% by mass or less, 99.5% by mass or less, or 99% by mass or less, based on the total amount of the refrigerating machine oil.

Examples of the phosphorus-containing additive contained in the refrigerating machine oil according to the present embodiment include a phosphorus-based extreme pressure agent. Examples of the phosphorus-based extreme pressure agent include a phosphoric acid ester, an acidic phosphoric acid ester, an amine salt of acidic phosphoric acid ester, a chlorinated phosphoric acid ester, a phosphorous acid ester, and a thiophosphoric acid. These phosphorus-containing additives may be used alone or in combination of two or more thereof. The phosphorus-containing additive is preferably at least one selected from the group consisting of a phosphoric acid ester and a thiophosphoric acid, and more preferably at least one selected from the group consisting of triphenyl phosphate (TPP), tricresyl phosphate (TCP), and triphenyl phosphorothionate (TPPT).

From the viewpoint of more effectively reducing the friction coefficient, the content of the phosphorus-containing additive is preferably 0.01% by mass or more, more preferably 0.1% by mass or more, and even more preferably 1% by mass or more, and is preferably 5% by mass or less, more preferably 3% by mass or less, and even more preferably 2% by mass or less, based on the total amount of the refrigerating machine oil.

The polymer contained in the refrigerating machine oil according to the present embodiment contains an unsaturated carboxylic acid ester as a monomer unit. The polymer is obtained by polymerizing one or two or more monomers containing an unsaturated carboxylic acid ester that is an ester of an unsaturated carboxylic acid (carboxylic acid having polymerizable unsaturated bond) and an alcohol.

The polymer is not particularly limited as long as it contains the unsaturated carboxylic acid ester, and may further contain an additional monomer (a monomer copolymerizable with an unsaturated carboxylic acid ester). That is, the polymer may be a homopolymer of one of the unsaturated carboxylic acid ester, a copolymer of two or more of the unsaturated carboxylic acid esters, or a copolymer of one or two or more of the unsaturated carboxylic acid esters and one or two or more of the additional monomers.

The unsaturated carboxylic acid constituting the unsaturated carboxylic acid ester has at least one polymerizable unsaturated bond (polymerizable carbon-carbon double bond) and at least one carboxyl group, and may be, for example, an unsaturated monocarboxylic acid having one polymerizable unsaturated bond and one carboxyl group, or an unsaturated dicarboxylic acid having one polymerizable unsaturated bond and two carboxyl groups. Examples of the unsaturated monocarboxylic acid include acrylic acid, methacrylic acid (hereinafter collectively referred to as "(meth) acrylic acid"), and crotonic acid. Examples of the unsaturated dicarboxylic acid include maleic acid, fumaric acid, citraconic acid, mesaconic acid, and itaconic acid.

The alcohol constituting the unsaturated carboxylic acid ester may be, for example, an alcohol having 1 to 40 carbon atoms, preferably contains an alcohol having 1 to 18 carbon atoms, and more preferably contains an alcohol having 1 to 8 carbon atoms. These alcohols may be linear or branched. The alcohol may contain an alcohol having 1 to 18 carbon atoms and an alcohol having 20 to 40 carbon atoms. These alcohols may be aliphatic alcohols.

The alcohol may be a monohydric alcohol or a polyhydric alcohol. Examples of such alcohols include methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, and octadecanol (these may be linear or branched).

The alcohol preferably contains at least one selected from a linear aliphatic monohydric alcohol having 1 to 18 carbon atoms and a branched aliphatic monohydric alcohol having 4 to 40 carbon atoms. In other words, the unsaturated carboxylic acid ester preferably has at least one alkyl group selected from a linear alkyl group having 1 to 18 carbon atoms and a branched alkyl group having 4 to 40 carbon atoms.

When the unsaturated carboxylic acid ester is a (meth)acrylic acid ester, the (meth)acrylic acid ester preferably contains at least one selected from a (meth)acrylic acid ester having a linear alkyl group having 1 to 18 carbon atoms, and more preferably contains at least one selected from a (meth)acrylic acid ester having a linear alkyl group having 1 to 18 carbon atoms and at least one selected from a (meth)acrylic acid ester having a 2-position branched alkyl group having 4 or more and less than 20 carbon atoms. Here, the 2-position branched alkyl group having 4 or more and less than 20 carbon atoms is an alkyl group represented by the following formula (1):

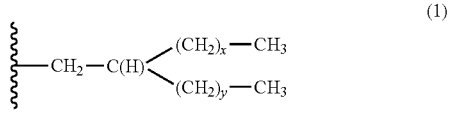

(1)

wherein x and y are each independently an integer of 0 or more and an integer such that x+y is less than 16.

In the case where the unsaturated carboxylic acid ester is an unsaturated dicarboxylic acid ester, the unsaturated dicarboxylic acid ester preferably contains at least one selected from unsaturated dicarboxylic acid esters having a linear alkyl group having 4 to 10 carbon atoms.

The monomer other than the unsaturated carboxylic acid ester (a monomer copolymerizable with the unsaturated carboxylic acid ester) is not particularly limited, and examples thereof include unsaturated carboxylic acids or anhydrides thereof exemplified as the unsaturated carboxylic acid constituting the unsaturated carboxylic acid ester described above, unsaturated hydrocarbon compounds having a polymerizable unsaturated bond, and the like. The unsaturated hydrocarbon may be, for example, an unsaturated hydrocarbon compound having 2 to 20 carbon atoms, and may be preferably an α-olefin having 2 to 20 carbon atoms or styrene. Specific examples of the α-olefin include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene. The α-olefin is preferably an α-olefin having 8 to 12 carbon atoms.

The polymer is preferably a copolymer of the unsaturated carboxylic acid esters (two or more unsaturated carboxylic acid esters) or a copolymer of the unsaturated carboxylic acid carboxylic acid ester (one or more unsaturated carboxylic acid esters) and the α-olefin (one or more α-olefins). The copolymer of the unsaturated carboxylic acid ester is preferably a copolymer of the (meth)acrylic acid esters. The copolymer of the unsaturated carboxylic acid ester and the α-olefin is preferably at least one selected from the group consisting of a copolymer of the (meth)acrylic acid ester and the α-olefin, and a copolymer of the unsaturated dicarboxylic acid ester and the α-olefin, and more preferably a copolymer of the unsaturated dicarboxylic acid ester and the α-olefin.

Preferred examples of the unsaturated dicarboxylic acid ester in the copolymer of the unsaturated dicarboxylic acid ester and the α-olefin include monoesters or diesters of unsaturated dicarboxylic acids such as maleic acid, fumaric acid, citraconic acid, mesaconic acid, and itaconic acid with aliphatic alcohols having 3 to 10 carbon atoms such as propanol, butanol, pentanol, hexanol, heptanol, octanol, nonanol, and decanol. The aliphatic alcohol having 3 to 10 carbon atoms is preferably a linear aliphatic alcohol having 4 to 10 carbon atoms. The unsaturated dicarboxylic acid ester is preferably a maleic acid ester. Preferred examples of the maleic acid ester include dimethyl maleate, diethyl maleate, dipropyl maleate, dibutyl maleate, dipentyl maleate, dihexyl maleate, diheptyl maleate, dioctyl maleate and didecyl maleate.

When the polymer is a copolymer, the content of the unsaturated carboxylic acid ester may be 10% by mole or more, 30% by mole or more, or 50% by mole or more, and may be 90% by mole or less, 70% by mole or less, or 50% by mole or less, based on the total amount of monomer units constituting the copolymer.

When the polymer is a copolymer of the unsaturated carboxylic acid ester and the α-olefin, the molar ratio of unsaturated carboxylic acid ester/α-olefin is not particularly limited, but may be preferably 1/9 or more, more preferably 3/7 or more, and is preferably 9/1, more preferably 7/3 or less.

The number average molecular weight (Mn) of the polymer is preferably 300 or more, more preferably 1000 or more, and even more preferably 1500 or more, and may be 2000 or more, 3000 or more, or 4000 or more, and is preferably 500000 or less, more preferably 50000 or less, and even more preferably 30000 or less, and may be 20000 or less, 15000 or less, or 10000 or less.

The weight average molecular weight (Mw) of the polymer is preferably 400 or more, more preferably 1000 or more, even more preferably 2000 or more, and particularly preferably 3000 or more, and may be 4000 or more, 5000 or more, 6000 or more, 7000 or more, 8000 or more, or 9000 or more, and is preferably 10000000 or less, more preferably 100000 or less, even more preferably 50000 or less, and particularly preferably 30000 or less, and may be 20000 or less.

Mw/Mn of the polymer is preferably 1.2 or more, more preferably 1.5 or more, even more preferably 1.7 or more, and particularly preferably 2 or more, and is preferably 5 or less, more preferably 3.5 or less, and even more preferably 3 or less, and may be 2.5 or less.

In the present specification, "weight average molecular weight (Mw)" and "number average molecular weight (Mn)" respectively mean a weight average molecular weight and a number average molecular weight in terms of polystyrene determined by gel permeation chromatography (GPC) (standard substance: polystyrene) using an APC XT column manufactured by Waters Corporation as a column and tetrahydrofuran as a mobile phase.

The kinematic viscosity at 100° C. of the polymer is preferably 10 mm²/s or more, more preferably 20 mm²/s or more, even more preferably 100 mm²/s or more, and is preferably 100000 mm²/s or less or 10000 mm²/s or less, more preferably 1000 mm²/s or less, even more preferably 800 mm²/s or less, and may be 500 mm²/s or less.

The kinematic viscosity at 40° C. of the polymer is preferably 100 mm²/s or more, more preferably 200 mm²/s or more, and even more preferably 400 mm²/s or more than 400 mm²/s, and may be 500 mm²/s or 1000 mm²/s or more, and is preferably 100000 mm²/s or less, more preferably 20000 mm²/s or less, and even more preferably 15000 mm²/s or less, and may be 10000 mm²/s or less or 5000 mm²/s or less.

The viscosity index of the polymer is preferably 80 or more, more preferably 140 or more, and may be 180 or more or 200 or more, and is preferably 400 or less, more preferably 300 or less, and may be 250 or less. The viscosity index in the present specification means a viscosity index measured in accordance with JIS K2283:2000.

The polymer preferably has a residual carbon content in a specific range when evaporated and thermally decomposed. Although the reason for this is unclear, it is presumed that the presence of a precursor (polymer precursor) corresponding to the residual carbon content can further reduce the friction coefficient in a specific slip speed region. The residual carbon content of the polymer is, for example, 0.2% by mass or more, preferably 0.5% by mass or more, more preferably 1% by mass or more, and even more preferably 1.5% by mass or more, and may be 2% by mass or more or 2.5% by mass or more, and is preferably 10% by mass or less, more preferably 5% by mass or less, and even more preferably 4% by mass or less, and may be 3.5% by mass or less. The residual carbon content in the present specification means a residual carbon content measured by a micro method in accordance with JIS K2270-2:2009.

The polymer according to the present embodiment may be added as a polymer additive in a refrigerating machine oil. The polymer additive may further contain, in addition to the polymer, components other than the polymer, such as a diluent oil, in order to improve handling properties during synthesis, transportation, and the like. The characteristics of the polymer described above (number average molecular weight (Mn), weight average molecular weight (Mw), Mw/Mn, kinematic viscosity at 100° C., kinematic viscosity at 40° C., viscosity index, and residual carbon content) can also be read as characteristics of a polymer additive in a state of being added to a refrigerating machine oil. However, when the polymer additive contains a component other than the polymer, the number average molecular weight (Mn) and the weight average molecular weight (Mw) of the polymer additive mean values measured excluding the other component.

In calculating the average molecular weight of the polymer in the polymer additive or the refrigerating machine oil containing the polymer additive, the average molecular weight of the polymer may be calculated by the gel permeation chromatography described above using a sample obtained by fractionating and removing components belonging to the other components from the polymer additive or the refrigerating machine oil containing the polymer additive by rubber membrane dialysis or the like.

More specific examples of the polymer (polymer additive) described above include polymers described in Examples described later, and other examples include the following polymers (polymer additives).

Polymer additive A: copolymer of (meth)acrylic esters (kinematic viscosity at 100° C.: 600 mm²/s, Mn of polymer: 25000, Mw/Mn: 1.4, residual carbon content: 1.1% by mass)

Polymer additive B: copolymer of (meth)acrylic esters (kinematic viscosity at 100° C.: 370 mm²/s, Mn of polymer: 25900, Mw/Mn: 1.3, residual carbon content: 1.1% by mass)

Polymer additive C: copolymer of (meth)acrylic esters (kinematic viscosity at 100° C.: 180 mm²/s, Mn of polymer: 3620, Mw/Mn: 2.0, residual carbon content: 1.3% by mass)

Polymer additive D: copolymer of (meth)acrylic esters (kinematic viscosity at 100° C.: 360 mm²/s, Mn of polymer: 11000, Mw/Mn: 1.6, residual carbon content: 0.9% by mass)

Polymer additive E: copolymer of (meth)acrylic esters (kinematic viscosity at 100° C.: 380 mm²/s, Mn of polymer: 22500, Mw/Mn: 1.5, residual carbon content: 0.1% by mass)

Polymer additive F: copolymer of maleic acid ester and α-olefin (kinematic viscosity at 40° C.: 1980 mm²/s, kinematic viscosity at 100° C.: 200 mm²/s, viscosity index: 227, Mn of polymer: 4500, Mw/Mn: 2.2, residual carbon content: 3.1% by mass)

Polymer additive G: a copolymer of maleic acid ester and α-olefin (kinematic viscosity at 40° C.: 4100 mm²/s, kinematic viscosity at 100° C.: 260 mm²/s, viscosity index: 190, Mn of polymer: 1800, Mw/Mn: 2.7, residual carbon content: 2.8% by mass)

Polymer additive H: copolymer of maleic acid ester and α-olefin (kinematic viscosity at 40° C.: 4300 mm²/s, kinematic viscosity at 100° C.: 300 mm²/s, viscosity index: 225, Mn of polymer: 2000, Mw/Mn: 2.5, residual carbon content: 1.7% by mass)

Polymer additive I: a copolymer of maleic acid ester and α-olefin (kinematic viscosity at 40° C.: 7000 mm²/s, kinematic viscosity at 100° C.: 500 mm²/s, viscosity index: 230, Mn of polymer: 2650, Mw/Mn: 4.0, residual carbon content: 2% by mass)

Polymer additive J: copolymer of maleic acid ester and α-olefin (kinematic viscosity at 40° C.: 11000 mm²/s, kinematic viscosity at 100° C.: 700 mm²/s, viscosity index: 250, Mn of polymer: 2690, Mw/Mn: 3.1, residual carbon content: 1.5% by mass)

Polymer additive K: copolymer of maleic acid ester and α-olefin (kinematic viscosity at 40° C.: 400 mm²/s, kinematic viscosity at 100° C.: 40 mm²/s, viscosity index: 160, residual carbon content: 0.8% by mass)

The content of the polymer is preferably 0.1% by mass or more, more preferably 0.5% by mass or more, and even more preferably 0.8% by mass or more, from the viewpoint of further improving the friction characteristics of the refrigerating machine oil, and may be preferably 5% by mass or less, more preferably 2% by mass or less, still more preferably less than 2% by mass, particularly preferably 1% by mass or less, and may be less than 1% by mass, from the viewpoint of suppressing the viscosity at 100° C. of the refrigerating machine oil and achieving a lower friction coefficient even in a region where the sliding speed is relatively high, based on the total amount of the refrigerating machine oil The refrigerating machine oil according to the present embodiment may further contain an additional additive in addition to the above-described components. Examples of the additive include an antioxidant, an acid scavenger, a phosphorus-free extreme pressure agent, a metal deactivator, an anti-wear agent, a pour point depressant, a detergent dispersant and a defoaming agent. The content of these additives may be 10% by mass or less, or 5% by mass or less, based on the total amount of the refrigerating machine oil, unless otherwise specified below.

Examples of the antioxidant include phenol-based antioxidants and amine-based antioxidants. Examples of the phenol-based antioxidant include 2,6-di-tert.-butyl-p-cresol (DBPC), 2,6-di-tert.-butyl-phenol, and 4,4'-methylenebis (2,6-di-tert.-butyl-phenol). Examples of the amine-based antioxidant include phenyl-α-naphthylamines and dialkylated diphenylamines. These antioxidants may be used alone or in combination of two or more thereof. The content of the antioxidant is, for example, 0.01 to 5% by mass, preferably 0.1 to 3% by mass, based on the total amount of the refrigerating machine oil.

Examples of the acid scavenger include an epoxy compound (epoxy-based acid scavenger). Examples of the epoxy compound include glycidyl ether type epoxy compounds, glycidyl ester type epoxy compounds, aryloxirane compounds, alkyloxirane compounds, alicyclic epoxy compounds, epoxidized fatty acid monoesters, and epoxidized vegetable oils. These acid scavengers may be used alone or in combination of two or more thereof. The content of the acid scavenger is, for example, 0.01 to 5% by mass and preferably 0.1 to 3% by mass, based on the total amount of the refrigerating machine oil.

The kinematic viscosity at 40° C. of the refrigerating machine oil may be 10 mm$^2$/s or less, is preferably 6 mm$^2$/s or less, more preferably 5 mm$^2$/s or less, and still more preferably 4 mm$^2$/s or less. The lower limit of the kinematic viscosity at 40° C. of the refrigerating machine oil is not particularly limited, and may be, for example, 1 mm$^2$/s or more or 2 mm$^2$/s or more. The kinematic viscosity at 100° C. of the refrigerating machine oil may be preferably 0.5 mm$^2$/s or more, more preferably 0.8 mm$^2$/s or more, and still more preferably 1 mm$^2$/s or more. The kinematic viscosity at 100° C. of the refrigerating machine oil may be preferably 10 mm$^2$/s or less, more preferably 5 mm$^2$/s or less, still more preferably 3 mm$^2$/s or less, and particularly preferably 2 mm$^2$/s or less.

The viscosity index of the refrigerating machine oil may be −50 or more, preferably 0 or more, more preferably 50 or more, and may be 200 or less.

The pour point of the refrigerating machine oil may be preferably −10° C. or lower, more preferably −20° C. or lower. The pour point in the present specification mean a pour point measured in accordance with JIS K2269:1987.

The volume resistivity of the refrigerating machine oil may be preferably $1.0 \times 10^9$ (2·m or more, more preferably $1.0 \times 10^{10}$ (2·m or more, and still more preferably $1.0 \times 10^{11}$ (2·m or more. The volume resistivity in the present specification mean a volume resistivity at 25° C. measured in accordance with JIS C2101:1999.

The moisture content of the refrigerating machine oil may be preferably 200 ppm or less, more preferably 100 ppm or less, and still more preferably 50 ppm or less, based on the total amount of the refrigerating machine oil. The moisture content in the present specification means a moisture content measured in accordance with JIS K2275-2 or 3 (Karl Fischer volumetric titration method or coulometric titration method).

The acid value of the refrigerating machine oil may be preferably 1.0 mgKOH/g or less, more preferably 0.1 mgKOH/g or less. The hydroxyl value of the refrigerating machine oil is, for example, 10 mgKOH/g or less, preferably 5 mgKOH/g or less, and more preferably 2 mgKOH/g or less. The acid value in the present specification means an acid value measured in accordance with JIS K2501:2003. The hydroxyl value in the present specification means a hydroxyl value measured in accordance with JIS K0070:1992.

The ash content of the refrigerating machine oil may be preferably 100 ppm or less, and more preferably 50 ppm or less. The ash content in the present specification means an ash content measured in accordance with JIS K2272:1998.

The refrigerating machine oil according to the present embodiment is usually mixed with a refrigerant present in a state of a working fluid composition for a refrigerating machine oil in a refrigerating machine containing a refrigerant circulation system containing a compressor, a condenser, an expansion mechanism, and an evaporator, and lubricates, for example, a sliding member in the compressor. That is, another embodiment of the present invention is a working fluid composition for a refrigerating machine oil containing the refrigerating machine oil and a refrigerant. The content of the refrigerating machine oil in the working fluid composition for a refrigerating machine oil may be 1 to 500 parts by mass or 2 to 400 parts by mass, with respect to 100 parts by mass of the refrigerant.

Examples of the refrigerant include hydrocarbon refrigerants, saturated hydrofluorocarbon refrigerants, unsaturated hydrofluorocarbon refrigerants, fluorine-containing ether-based refrigerants such as perfluoroethers, bis (trifluoromethyl) sulfide refrigerants, trifluoroiodomethane refrigerants, and natural refrigerants such as ammonia and carbon dioxide. In particular, the refrigerating machine oil according to the present embodiment is preferably used together with a hydrocarbon refrigerant. In other words, the working fluid composition for a refrigerating machine oil preferably contains a refrigerating machine oil and a hydrocarbon refrigerant.

The hydrocarbon refrigerant is preferably a hydrocarbon having 1 to 5 carbon atoms, and more preferably a hydrocarbon having 2 to 4 carbon atoms. Specific examples of the hydrocarbon include methane, ethylene, ethane, propylene, propane (R290), cyclopropane, n-butane, isobutane (R600a), cyclobutane, methylcyclopropane, 2-methylbutane, n-pentane, and a mixture of two or more thereof. Among these, the hydrocarbon refrigerant is preferably a hydrocarbon refrigerant that is gaseous at 25° C. and 1 atm, and more preferably propane, normal butane, isobutane, 2-methylbutane, or a mixture thereof.

The saturated hydrofluorocarbon refrigerant is a saturated hydrofluorocarbon having preferably 1 to 3 carbon atoms, more preferably 1 to 2 carbon atoms. Specific examples of the saturated hydrofluorocarbon refrigerant include difluoromethane (R32), trifluoromethane (R23), pentafluoroethane (R125), 1,1,2,2-tetrafluoroethane (R134), 1,1,1,2-tetrafluoroethane (R134a), 1,1,1-trifluoroethane (R143a), 1,1-difluoroethane (R152a), fluoroethane (R161), 1,1,1,2,3,3,3-heptafluoropropane (R227ea), 1,1,1,2,3,3-hexafluoropropane (R236ea), 1,1,1,3,3,3-hexafluoropropane (R236fa), 1,1,1,3,3-pentafluoropropane (R245fa), and 1,1,1,3,3-pentafluorobutane (R365mfc), or a mixture of two or more thereof.

The saturated hydrofluorocarbon refrigerant is appropriately selected from the above depending on the application and the required performance. Examples of the saturated hydrofluorocarbon refrigerant include R32 alone; R23 alone; R134a alone; R125 alone; a mixture of R134a/R32 of 60 to 80% by mass/40 to 20% by mass; a mixture of R32/R125 of 40 to 70% by mass/60 to 30% by mass; a mixture of R125/R143a of 40 to 60% by mass/60 to 40% by mass; a mixture of R134a/R32/R125 of 60% by mass/30% by mass/10% by mass; a mixture of R134a/R32/R125 of 40 to 70% by mass/15 to 35% by mass/5 to 40% by mass; and a mixture of R125/R134a/R143a of 35 to 55% by mass/1 to 15% by mass/40 to 60% by mass. More specific examples of the saturated hydrofluorocarbon refrigerant include a mixture of R134a/R32 of 70/30% by mass; a mixture of R32/R125 of 60/40% by mass; a mixture of R32/R125 of 50/50% by mass (R410A); a mixture of R32/R125 of 45/55% by mass (R410B); a mixture of R125/R143a of 50/50% by mass (R507C); a mixture of R32/R125/R134a of 30/10/60% by mass; a mixture of R32/R125/R134a of 23/25/52% by mass (R407C); a mixture of R32/R125/R134a of 25/15/60% by mass (R407E); and a mixture of R125/R134a/R143a of 44/4/52% by mass (R404A).

The unsaturated hydrofluorocarbon (HFO) refrigerant is preferably an unsaturated hydrofluorocarbon having 2 to 3 carbon atoms, more preferably a fluoropropene, and still more preferably a fluoropropene having 3 to 5 fluorine atoms. The unsaturated hydrofluorocarbon refrigerant is preferably any one or a mixture of two or more of 1,2,3,3,3-pentafluoropropene (HFO-1225ye), 1333-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243zf). The unsaturated hydrofluorocarbon refrigerant is preferably one or two or more selected from HFO-1225ye, HFO-1234ze and HFO-1234yf from the viewpoint of refrigerant physical properties. The unsaturated hydrofluorocarbon refrigerant may be fluoroethylene, and is preferably 1,1,2,3-trifluoroethylene.

EXAMPLES

Hereinafter, the present invention will be described in more detail based on examples, but the present invention is not limited to the following examples.
(Lubricating Base Oil)
Base oils 1 to 3 shown below were prepared and mixed such that the contents of base oil 1, base oil 2, and base oil 3 were 50 parts by mass, 43 parts by mass, and 7 parts by mass, respectively, as shown in Table 1, to obtain mixed base oils.

Base oil 1: mineral oil (kinematic viscosity at 40° C.: 3.4 mm$^2$/s)
Base oil 2: mineral oil (kinematic viscosity at 40° C.: 2.4 mm$^2$/s)
Base oil 3: mineral oil (kinematic viscosity at 40° C.: 100 mm$^2$/s)

The base oil 1 and the base oil 2 correspond to the first hydrocarbon base oil described above, and the base oil 3 corresponds to the second hydrocarbon base oil described above.

The kinematic viscosity at 40° C. of the obtained mixed base oil (A) [mm$^2$/s], the kinematic viscosity at 40° C. of the first hydrocarbon base oil (a mixture of base oil 1/base oil 2=50 parts by mass/43 parts by mass) (B) [mm$^2$/s], and the value of (A)/(B) ratio are shown in Table 1 below.

TABLE 1

|  |  |  | Mixed base oil |
|---|---|---|---|
| First hydrocarbon base oil | Base oil 1 | Parts by mass | 50 |
|  | Base oil 2 |  | 43 |
| Second hydrocarbon base oil | Base oil 3 |  | 7 |

TABLE 1-continued

|  |  |  | Mixed base oil |
|---|---|---|---|
| Properties regarding kinematic viscosity | (A) | mm$^2$/s | 3.35 |
|  | (B) |  | 2.80 |
|  | (A)/(B) | — | 1.20 |

(Refrigerating Machine Oil)
In Examples and Comparative Examples, a refrigerating machine oil (kinematic viscosity at 40° C.: 3.3 to 3.7 mm$^2$/s) having a composition (% by mass based on the total amount of the refrigerating machine oil) shown in Table 2 was prepared using the lubricating base oil (mixed base oil), and the following polymer and phosphorus-containing additive as additives.

Polymer 1: copolymer of methacrylic acid alkyl esters (methacrylic acid alkyl esters contain, as main components, methacrylic acid alkyl esters having a linear alkyl group having 1, 12 to 16, or 18 carbon atoms and methacrylic acid alkyl esters having a 2-position branched alkyl group having 6, 8, or 10 or more and less than 20 carbon atoms, Mn: 9300, Mw: 16000, and Mw/Mn: 1.7)

Polymer 2: a copolymer of maleic acid dialkyl esters and α-olefins having 8 to 10 carbon atoms (the maleic acid dialkyl esters contain, as a main component, a maleic acid dialkyl ester having a linear alkyl group having 4 and 8 to 10 carbon atoms, Mn: 8300, Mw: 12800, and Mw/Mn: 1.5).

Polymer 3: a copolymer of methacrylic acid alkyl esters and α-olefins having 10 carbon atoms (methacrylic acid alkyl esters contain, as main components, methacrylic acid alkyl esters having a linear alkyl group having 12 to 15 carbon atoms and methacrylic acid alkyl esters having a 2-position branched alkyl group having 6, 8, 10 or more and less than 20 carbon atoms, Mn: 6900, Mw: 9900, and Mw/Mn: 1.4).

Phosphorus-containing additive: a mixture of tricresyl phosphate (TCP) and triphenyl phosphorothionate (TPPT)
(Evaluation of Friction Characteristics)
In order to evaluate the friction characteristics of each of the refrigerating machine oils of Examples and Comparative Examples, the following tests were performed.

Using an MTM (Mini Traction Machine) tester (manufactured by PCS Instruments), the friction coefficient (u) in each lubrication region was measured under the following conditions. The results are shown in Table 2. The smaller the friction coefficient is, the more excellent the friction characteristics are.

Ball and disc: standard test piece (AISI52100 standard)
Test temperature: 40° C.
Sliding speed: 0.0006 to 0.9 m/s (partially extracted)
Load: 10N
Slip ratio: 30%
The value of $|U_D - U_B|$ [m/s] was used as the sliding speed, wherein $U_D$ is the speed [m/s] of the disk in the sliding part and $U_B$ is the speed [m/s] of the ball in the sliding part.

TABLE 2

|  |  | Example 1 | Example 2 | Example 3 | Example 4 | Example 5 | Comp. Example 1 | Comp. Example 2 | Comp. Example 3 |
|---|---|---|---|---|---|---|---|---|---|
| Composition (% by mass) | Lubricating base oil | Balance | Balance | Balance | Balance | Balance | Balance | Balance | Balance |
|  | Polymer 1 | 1 | — | — | — | — | — | — | 1 |
|  | Polymer 2 | — | 1 | 3 | 5 | — | — | — | — |
|  | Polymer 3 | — | — | — | — | 1 | — | — | — |
|  | Phosphorus-containing additive | 1.7 | 1.7 | 1.7 | 1.7 | 1.7 | — | 1.7 | — |

TABLE 2-continued

|  |  | Example 1 | Example 2 | Example 3 | Example 4 | Example 5 | Comp. Example 1 | Comp. Example 2 | Comp. Example 3 |
|---|---|---|---|---|---|---|---|---|---|
| Kinematic viscosity at 40° C. (mm$^2$/s) | | 3.4 | 3.4 | 3.5 | 3.7 | 3.4 | 3.3 | 3.3 | 3.4 |
| Friction coefficient ($\mu$) | Sliding speed (m/s) | | | | | | | | |
|  | 0.21 | 0.0217 | 0.0217 | 0.0208 | 0.0193 | 0.0210 | 0.0217 | 0.0249 | 0.0249 |
|  | 0.15 | 0.0260 | 0.0261 | 0.0246 | 0.0221 | 0.0249 | 0.0266 | 0.0308 | 0.0311 |
|  | 0.09 | 0.0358 | 0.0364 | 0.0327 | 0.0283 | 0.0346 | 0.0397 | 0.0448 | 0.0460 |
|  | 0.06 | 0.0462 | 0.0478 | 0.0418 | 0.0357 | 0.0470 | 0.0583 | 0.0582 | 0.0569 |
|  | 0.027 | 0.0740 | 0.0771 | 0.0658 | 0.0558 | 0.0734 | 0.0981 | 0.0864 | 0.0846 |

It can be seen that the refrigerating machine oils of Examples 1 to 5 have excellent friction characteristics even in a region where the sliding speed is low while maintaining friction characteristics in a region where the sliding speed is relatively high. On the other hand, it can be seen that the refrigerating machine oils of Comparative Examples 2 and 3 containing only one of the polymer additive and the phosphorus-containing additive can reduce the friction coefficient to some extent in a region where the sliding speed is low, however, that the friction coefficient thereof increases in the region where the sliding speed is relatively high, as compared with Comparative Example 1 containing neither of the polymer additive and the phosphorus-containing additive. In Examples 1 to 5, the phosphorus-containing additive was replaced with triphenyl phosphate, and the friction characteristics were evaluated in the same manner, and the same effects were obtained.

The invention claimed is:

1. A refrigerating machine oil comprising:
  a lubricating base oil comprising a mineral oil;
  a phosphorus-containing additive comprising at least one selected from the group consisting of triphenyl phosphate, tricresyl phosphate and triphenyl phosphorothionate; and
  a polymer selected from the group consisting of:
    (I) a copolymer comprising at least one of a first (meth)acrylic acid ester and at least one of a second (meth)acrylic acid ester, as monomer units, the first (meth)acrylic acid ester having a linear alkyl group having 1 to 18 carbon atoms, and the second (meth) acrylic acid ester having a 2-position branched alkyl group having 4 or more and less than 20 carbon atoms, wherein the copolymer of (I) is selected from:
      (i) a copolymer consisting of the first (meth)acrylic acid alkyl ester and the second (meth)acrylic acid alkyl ester, as monomer units, and
      (ii) a copolymer consisting of the first (meth)acrylic acid alkyl ester, the second (meth)acrylic acid alkyl ester and an α-olefin having 8 to 12 carbon atoms, as monomer units; and
    (II) a copolymer consisting of a maleic acid ester and an α-olefin having 8 to 12 carbon atoms, as monomer units, wherein the maleic acid ester is an ester of maleic acid and an alcohol comprising a linear aliphatic alcohol having 4 to 10 carbon atoms,
  wherein the polymer has a number average molecular weight (Mn) of 4000 or more and 20000 or less, a weight average molecular weight (Mw) of 8000 or more and 30000 or less, and an Mw/Mn of 1.2 or more and 2.5 or less,
  wherein the refrigerating machine oil has a kinematic viscosity at 40° C. of 10 mm$^2$/s or less, and is used with a refrigerant, and
  wherein
    a content of the lubricating base oil is 90% by mass or more,
    a content of the phosphorus-containing additive is 0.1% by mass or more and 3% by mass or less, and
    a content of the polymer is 0.5% by mass or more and 5% by mass or less, based on the total amount of the refrigerating machine oil.

2. The refrigerating machine oil according to claim 1, wherein the lubricating base oil comprises a first hydrocarbon base oil having a kinematic viscosity at 40° C. of less than 6 mm$^2$/s.

3. The refrigerating machine oil according to claim 2, wherein the lubricating base oil is a mixed base oil of the first hydrocarbon base oil and a second hydrocarbon base oil having a kinematic viscosity at 40° C. of 6 mm$^2$/s or more, and
  a (A)/(B) ratio is more than 1 and 1.5 or less, wherein (A) is a kinematic viscosity at 40° C. of the mixed base oil, and (B) is the kinematic viscosity at 40° C. of the first hydrocarbon base oil.

4. The refrigerating machine oil according to claim 1, wherein the polymer is the copolymer consisting of the first (meth)acrylic acid alkyl ester and the second (meth)acrylic acid alkyl ester, as monomer units.

5. A working fluid composition for a refrigerating machine oil comprising:
  the refrigerating machine oil according to claim 1; and
  a refrigerant.

* * * * *